United States Patent
Cai et al.

(10) Patent No.: US 11,325,788 B2
(45) Date of Patent: May 10, 2022

(54) DOUBLE-LOOP CROSS-BELT SORTER, CROSS-BELT SORTER SYSTEM AND SORTING METHOD

(71) Applicant: SUZHOU JINFENG IOT TECHNOLOGY CO., LTD., Jiangsu (CN)

(72) Inventors: Xi Cai, Jiangsu (CN); JinCheng Li, Jiangsu (CN)

(73) Assignee: SUZHOU JINFENG IOT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/040,530

(22) PCT Filed: Aug. 5, 2019

(86) PCT No.: PCT/CN2019/099213
§ 371 (c)(1),
(2) Date: Sep. 22, 2020

(87) PCT Pub. No.: WO2020/082848
PCT Pub. Date: Apr. 30, 2020

(65) Prior Publication Data
US 2021/0016974 A1    Jan. 21, 2021

(30) Foreign Application Priority Data

Oct. 25, 2018    (CN) .......................... 201811249683.9

(51) Int. Cl.
*B65G 47/42*    (2006.01)
*B65G 47/34*    (2006.01)
(Continued)

(52) U.S. Cl.
CPC .......... *B65G 35/02* (2013.01); *B65G 2207/18* (2013.01)

(58) Field of Classification Search
CPC ........ B65G 35/02; B65G 47/34; B65G 47/42; B65G 47/46
(Continued)

(56) References Cited

U.S. PATENT DOCUMENTS 3,550,748 A * 12/1970 Hauer .................. B65G 17/345
198/370.06
4,096,936 A * 6/1978 Nielsen ................ B65G 17/345
198/370.06
(Continued)

FOREIGN PATENT DOCUMENTS

CN    204528591 U    8/2015
CN    105035673 A    11/2015
(Continued)

*Primary Examiner* — Douglas A Hess
(74) *Attorney, Agent, or Firm* — Novick, Kim & Lee, PLLC; Allen Xue

(57) ABSTRACT

A two-loop cross-belt sorter includes at least one loop-shaped track (1); two cross-belt trolley groups (2), and forms two side-by-side conveyance loops able to circulate on the loop-shaped track (1), and a power apparatus (3) that drives the two cross-belt trolley groups (2) to move along the loop-shaped track (1). The two-loop cross-belt sorter uses two sets of trolleys on a loop-shaped track, allows the space inside the loop to be utilized and the quantity of cross-belt trolleys to be increased without increasing the area occupied by the sorter, thus doubling sorting capacity, while allowing parcels to be transferred between cross-belt trolleys on the two conveyance loops, thereby reducing the idle rate of the trolleys.

12 Claims, 10 Drawing Sheets

(51) Int. Cl.
*B65G 47/46* (2006.01)
*B65G 35/02* (2006.01)

(58) Field of Classification Search
USPC .................................. 198/370.06, 370.1
See application file for complete search history.

(56) References Cited

U.S. PATENT DOCUMENTS

| | | | | |
|---|---|---|---|---|
| 5,547,084 | A * | 8/1996 | Okada | B65G 54/02 |
| | | | | 209/583 |
| 5,588,520 | A * | 12/1996 | Affaticati | B61B 13/08 |
| | | | | 198/370.06 |
| 5,690,209 | A * | 11/1997 | Kofoed | B65G 17/345 |
| | | | | 198/370.03 |
| 5,701,992 | A * | 12/1997 | Enomoto | B65G 17/345 |
| | | | | 198/370.06 |
| 6,253,910 | B1 * | 7/2001 | Axmann | B65G 17/345 |
| | | | | 198/370.06 |
| 6,273,268 | B1 * | 8/2001 | Axmann | B65G 17/345 |
| | | | | 198/370.06 |
| 6,489,138 | B1 * | 12/2002 | Ebner | A61P 43/00 |
| | | | | 435/69.1 |
| 6,715,598 | B2 * | 4/2004 | Affaticati | B07C 5/36 |
| | | | | 198/357 |
| 7,080,725 | B2 * | 7/2006 | Hishinuma | B65G 17/345 |
| | | | | 198/370.06 |
| 7,987,963 | B2 * | 8/2011 | Baum | B65G 17/345 |
| | | | | 198/370.06 |
| 8,413,787 | B2 * | 4/2013 | Brouwer | B65G 47/96 |
| | | | | 198/370.08 |
| 9,150,362 | B2 * | 10/2015 | Vegh | B65G 47/34 |
| 9,233,803 | B2 * | 1/2016 | Pilarz | B65G 17/42 |
| 9,409,727 | B2 * | 8/2016 | German | B65G 13/11 |
| 9,676,566 | B2 * | 6/2017 | Porat | B07C 1/00 |
| 9,708,128 | B2 * | 7/2017 | Parodi | B65G 17/345 |
| 10,464,759 | B2 * | 11/2019 | Lykkegaard | B65G 54/02 |
| 10,853,928 | B2 * | 12/2020 | Smirnov | G06T 1/0007 |

FOREIGN PATENT DOCUMENTS

| | | |
|---|---|---|
| CN | 106276190 A | 1/2017 |
| CN | 206104379 U | 4/2017 |
| CN | 107051890 A | 8/2017 |
| CN | 108357879 A | 8/2018 |
| CN | 108554829 A | 9/2018 |
| CN | 109335538 A | 2/2019 |
| CN | 209209712 U | 8/2019 |
| WO | 2015195420 A1 | 12/2015 |

* cited by examiner

DOUBLE-LOOP CROSS-BELT SORTER, CROSS-BELT SORTER SYSTEM AND SORTING METHOD

TECHNOLOGICAL FIELD

This Invention relates to the sorting equipment in logistics field, in particular to double-row cross-belt sorter, cross-belt sorter system and sorting method.

BACKGROUND TECHNOLOGY

Sorting refers to the stacking of articles in accordance with different categories, inbound and outbound of the warehouse, the destination, and so on. It is intended to improve delivery and support the preparatory work of delivery, and it is the inevitable extension of different distribution enterprises to compete in delivery and improve their own economic benefits. Therefore, it can also be said that sorting is an inevitable requirement for the development of delivery to an advanced trend.

In order to improve the sorting capacity, the automatic sorter system was widely used in logistics and distribution centers in the United States, Japan and Europe after the World War II, where the cross-belt sorter system, as shown in the application No. 201810494195.8, is connected by a master-drive belt conveyor and a carrier with small belt conveyor (referred to as the "carrier") together. When the "carrier" moves to the specified sorting position, it rotates the belt to complete the task of sorting and delivering goods. Although it greatly improves the sorting capacity, the system itself needs a mechanical conveyor line as short as 40-50 meters or as long as 150-200 meters. Besides, such mechanical conveyor line is laid horizontally in a loop and occupies a large area, and internal space of the loop is not fully utilized, so there is a high requirement for the use of the site, with low utilization rate of the site and poor flexibility of application.

In addition, the way of motor+sprocket+chain is often used to drive the carrier. In this way, on the one hand, the carrier needs to be connected to the chain, which increases the difficulty of assembly; on the other hand, due to the pitch limitation of the chain, the gap between the carriers is relatively large, resulting in a reduction in the number of carriers to be arranged. Moreover, due to the limited number of driving points, in order to ensure sufficient driving force, the length of the chain often needs to be controlled in a reasonable range, while the limitation of chain length hinders the extension of the loop, which is not conducive to the expansion of the line.

INVENTION CONTENTS

This Invention aims at providing a kind of double-row cross-belt sorter, cross-belt sorter system and its sorting methods to solve the above problems in existing technologies.

The purpose of this Invention is realized through the following technical scheme:

Double-row cross-belt sorter includes:

At least one circular rail;

Two sets of cross-belt carriers, forming two conveying loops that are side by side and can be rotated cyclically on the circular rail;

Power Generator driving two sets of cross-belt carriers to move along the circular rail.

Preferably, in the double-row cross-belt sorter, the circular rail is arranged longitudinally or horizontally.

Preferably, in the double-row cross-belt sorter, there are two circular rails, with a height difference, and two sets of side-by-side cross-belt carriers are arranged on each circular rail.

Preferably, in the double-row cross-belt sorter, the cross-belt carriers in the two conveying loops correspond to each other one by one and move synchronously.

Preferably, in the double-row cross-belt sorter, the two side-by-side cross-belt carriers have a common frame which can slide on the circular rail or have a separate frame which can slide on the circular rail.

Preferably, in the double-row cross-belt sorter, each of the cross-belt carriers includes a belt conveyor arranged on the frame, and the belt conveyor is capable of two-way conveying.

Preferably, in the double-row cross-belt sorter, adjacent frames are connected by a joint bearing at rod end.

Preferably, in the double-row cross-belt sorter, the power unit comprises a driving plate arranged at least on a part of cross-belt carriers in each conveying loop and a linear motor or friction-driving device driving the driving plate by electromagnetic thrust and/or friction.

The cross-belt sorter system includes the above any double-loop cross-belt sorter and each conveying loop is connected with at least one infeed line. The double-loop cross-belt sorter and the infeed line are connected with a control device.

Preferably, in the cross-belt sorter system, the input end of the infeed line is provided with a parcel-oriented device.

Preferably, in the cross-belt sorter system, the infeed line includes a dynamic weighing section, and the balancing precision grade of the pulley for the conveyor line in the dynamic weighing section is not lower than G16.

Preferably, in the cross-belt sorter system, the wall thickness in the middle area of the pulley is larger than that in the area on both sides thereof.

Preferably, in the cross-belt sorter system, the diameter in the middle area of the pulley is larger than that in the area on both sides thereof, and the area on both sides forms a circular table shape small at the outer end and large at the inner end.

Preferably, in the cross-belt sorter system, the pulley is installed on a bracket for the conveyor line by an insert bearing with housing, and the insert bearing with housing is inversely mounted on the bracket.

As for the sorting method of the cross-belt sorter system, parcels can be transferred from one conveying loop to another side-by-side conveying loop.

The advantage of the technical scheme in this Invention is mainly included:

By using two sets of carriers in one circular rail, this scheme, featured by elaborate design and simple structure, can increase the quantity of cross-belt carriers by virtue of inner space in the loop line without increase of any occupied area, thus increasing the quantity of sorting chutes, improving the use efficiency of the sorter and decreasing the equipment cost. At the same time, this scheme enables the parcel transshipment between the cross-belt carriers of two conveying loops, that is, the parcel transshipment is conducted between the inner and outer carriers after infeed respectively inside and outside the rail according to the position requirement on the sorting chutes, so as to achieve the purpose of corresponding sliding chutes. Therefore, this scheme can reduce the vacancy rate of carriers, improve the infeed flexibility, and lower the layout requirements and occupied space of the infeed line.

The double-row cross-belt sorter in this scheme can be laid out and assembled in many ways, indicating a strong flexibility of application. Upon application of the longitudinal layout of rail, the longitudinal space can be sufficiently utilized to avoid requiring larger horizontal space by the way of horizontal layout in the existing technology, so as to greatly lower the requirement on application site and enhance the application flexibility.

This scheme, with layout of double-layer circular rail, can sufficiently utilize the longitudinal space while increasing no occupied area, further increasing the quantity of sorting equipment, thus improving the sorting capacity in multiples. For the infeed, direct supply from entrance can be applied, which can be located at the same vertical line; or the supply by the parcel feeder can be used. To be specific, it can be adjusted on the basis of the height and differential position layout, showing the good application flexibility.

This scheme leaves out the chains and other structures, by virtue of the solenoid-driven or friction-driven way, and dispenses with connection of the cross-belt carrier to the chain, enabling the assembly to be easier. Meanwhile, the spacing of the cross-belt carriers will no longer be limited to the chain pitch, so as to minimize the space of loop line for full utilization; moreover, the point position and quantity of the linear motors can be increased as required to increase the driving force so as to efficiently achieve the expansion of loop line, indicating a better application flexibility.

Each carrier in this scheme is provided with wheel at only one end, connected to the adjacent carrier with rod-end joint bearing, thus enabling each carrier to get enough degree of freedom in the direction change and improving the smoothness of direction change in the arc-shaped area and the fitting between the cross-belt carrier and rail.

Setting up the parcel-oriented device on the infeed line can convey the parcels to the cross-belt carrier in the same form and keep them in a right status on the carrier, for the convenience of subsequent sorting.

The dynamic balance performance of the pulley at the dynamic weighing section is improved to weaken the vibration produced upon high-speed rotation of the pulley, so as to reduce the influence of the vibration produced by the conveyer line on the sensor measurement accuracy. After improvement, the final error can be controlled within ±30 g, showing a great improvement of weighing accuracy, in comparison with the general error range between ±50-±100.

The wall thickness of the pulley at the dynamic weighing section is elaborately designed to further improve the pulley balancing precision, providing the possibility to increase the weighing accuracy.

Model design of the pulley at the dynamic weighing section is capable of utilizing the shape characteristics upon close fitting between the belt and pulley, to avoid the belt off-tracking problem.

Reversed installation of the bearing in the dynamic weighing section can enhance the equipment beauty to avoid any convex problem. In the meantime, it can also reduce the distance between the jackscrews on two bearings connecting the same pulley to lower down the risk that the jackscrew may get loose, and then guarantee the fastness of connection between the spindle and bearing, so as to decrease the possibility of pulley vibration. It is beneficial to vibration reduction and can guarantee the realization of weighing accuracy.

INSTRUCTION TO FIGURES

IMPLEMENTATION DETAILS

The purpose, advantage and characteristics of this Invention will be explained in diagram form through the non-restrictive illustration of the selected embodiments as follows. These embodiments are just the typical examples applying the technical scheme of this Invention, and any technical scheme formed by equivalent substitution or transformation falls within the scope of protection required by this Invention.

In the scheme description, it shall be noted that, the orientation or position relationships indicated by the terms, such as "center", "upper", "lower", "left", "right", "front", "rear", "vertical", "horizontal", "inner/inside" and "outer/outside", are the orientation or position relationships based on the figures. These terms are only for the convenience and simplification of description, rather than indicating or implying that the referred devices or elements must have specific orientation or be structured and operated in specific orientation, thus they cannot be interpreted as the restriction of this Invention. Furthermore, the terms like "first", "second" and "third" are only for description purpose and cannot be understood as indicating or implying the relative importance. Moreover, in the scheme description, by reference to the operation personnel, the direction close to the operator is the near end, and the direction far away from the operator is the far end.

Figure 1:
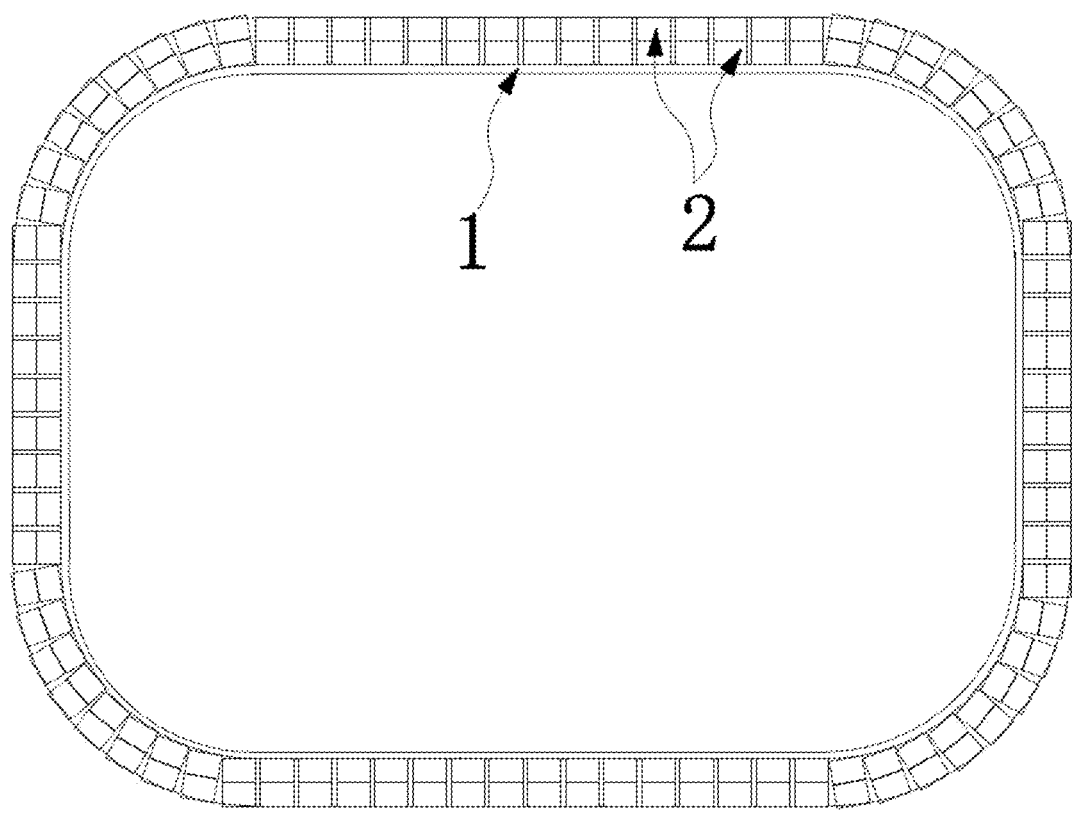
FIG. 1 is the schematic diagram for horizontal layout of the double-loop cross-belt sorter in this Invention.

The illustration is made to the double-loop cross-belt sorter revealed in this Invention in combination with the figures, as shown in FIG. 1, including At least one circular rail 1;

Two sets of cross-belt carriers 2, forming two conveying loops that are side by side and can be rotated cyclically on the circular rail 1.

Figure 2:
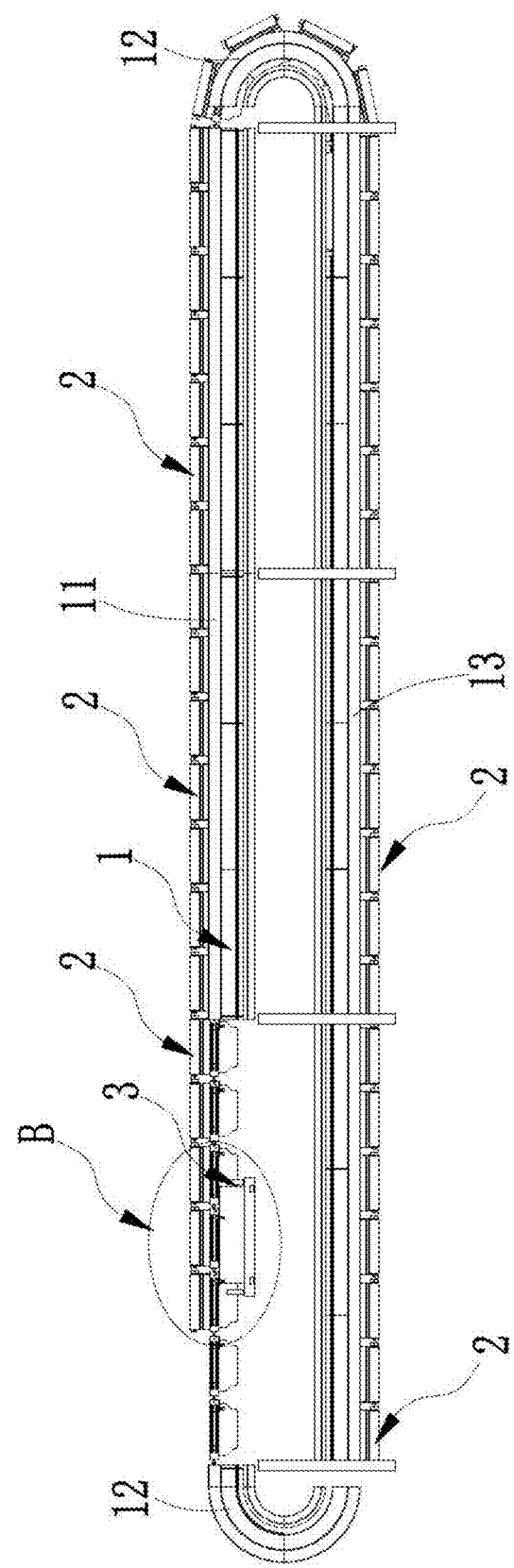
FIG. 2 is the lateral view for longitudinal layout of the double-loop cross-belt sorter in this Invention.

The circular rail 1 can be arranged horizontally as shown in FIG. 1. Moreover, the circular rail 1 can be laid in the shape of irregular loop and also can be circular, oval, waist-shaped, rounded rectangular or in other regular shape, preferably in the shape of rounded rectangle. In another embodiment, the circular rail 1 also can be arranged longitudinally as shown in FIG. 2, that is, it covers the upper layer 11 and lower layer 13 with height difference, and the current stage 12 connecting them.

Figure 3:
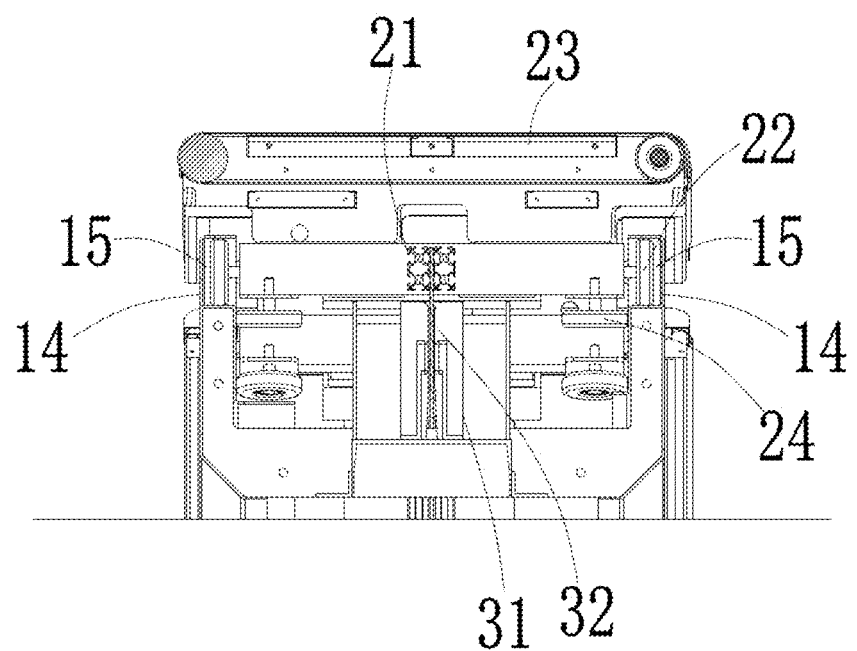
FIG. 3 is the schematic diagram for assembly status of the cross-belt carrier and circular rail in this Invention (one belt conveyor mounted on one bracket)

Besides, upon longitudinal layout of circular rail 1, when the cross-belt carrier 2 runs to lower layer 13, it will tend to breaking from the circular rail 1 under the effect of gravity. Therefore, as shown in FIG. 3, the sliding chute 15 for the wheel on the cross-belt carrier 2 to pass through will be formed respectively on the panel 14 at both sides of the circular rail 1, so that the wheel on the cross belt can be supported by the sliding chute 15, guaranteeing that it can continue sliding along the circular rail.

At the same time, in one feasible embodiment, two passages respectively for cyclic rotation of one conveyor loop can be formed on one circular rail 1. At the time, as shown in FIG. 3, the cross-belt carrier 2 of each conveyor loop contains the independent frame 21 able to slide on the passage. Hence, two conveyor loops can move independently, at the same or differential speed.

Figure 8:
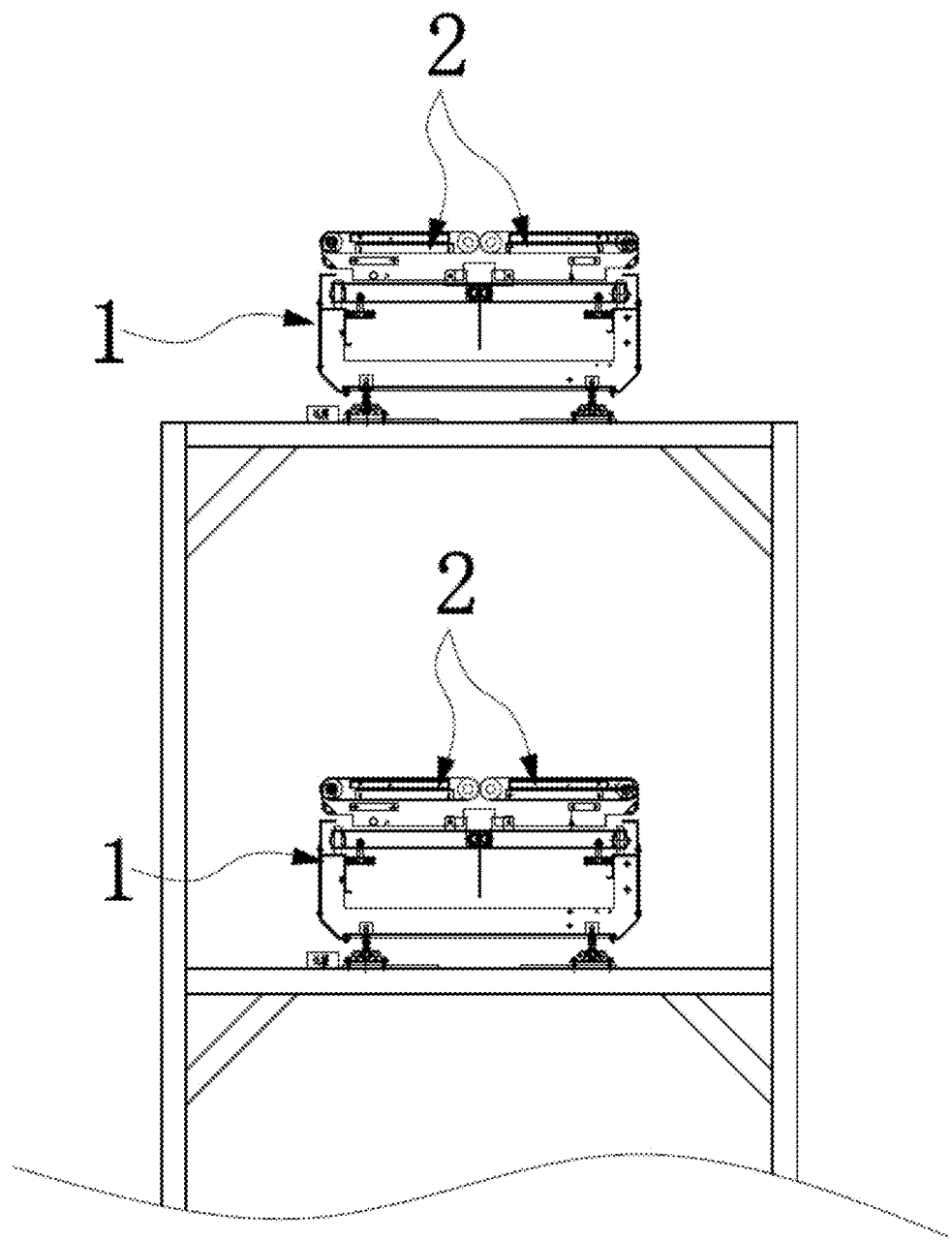
FIG. 8 is the schematic diagram of double-layer double-loop cross-belt sorter in this Invention (two belt conveyors mounted on one bracket)

Certainly, in another embodiment, as shown in FIG. 8, one circular rail 1 may also have only one passage for cyclic rotation of two conveyor loops. At the time, the cross-belt carriers 2 in two conveyor loops correspond to each other one by one and move synchronously, and two side-by-side cross-belt carriers 2 have the common frame 21 sliding on the passage, while two conveyor loops rotate synchronously at the time.

Figure 4:
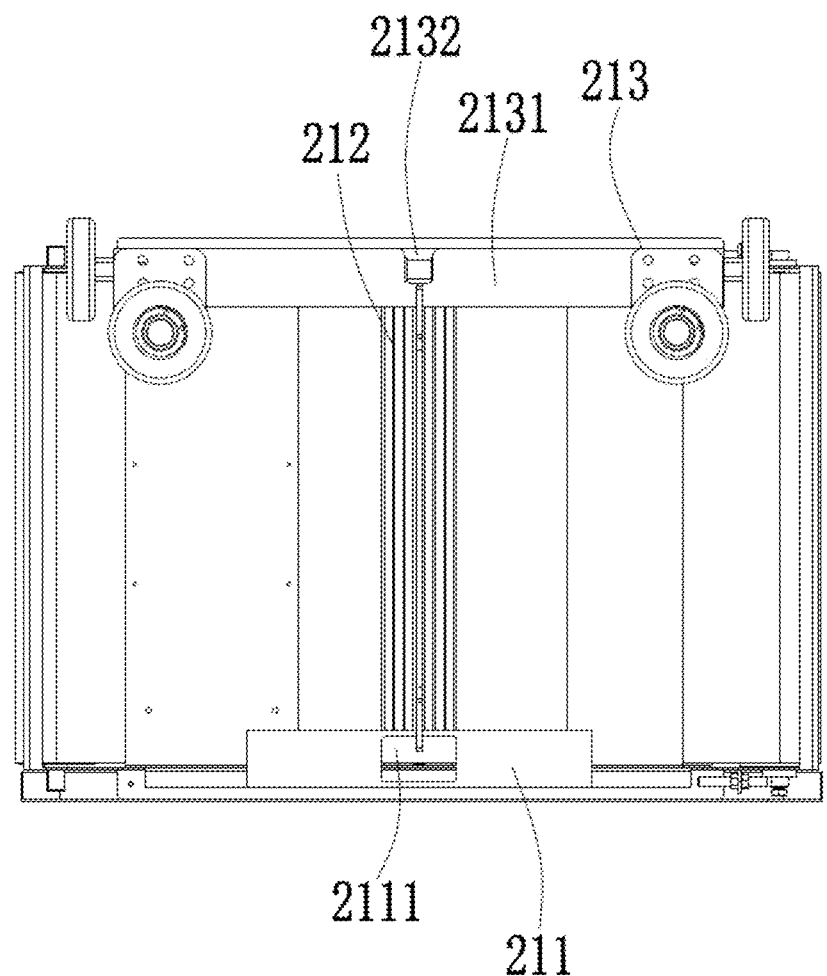
FIG. 4 is the top view of the cross-belt carrier in this Invention (one belt conveyor mounted on one bracket)
Figure 5:
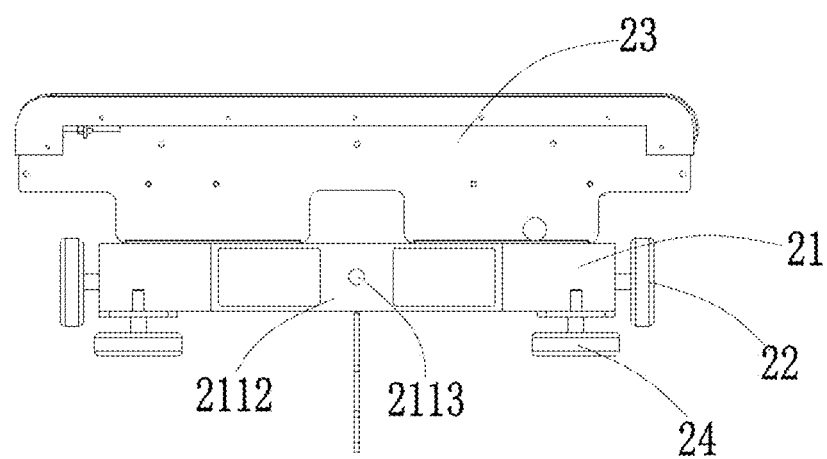
FIG. 5 and FIG. 6 are the two lateral views of the cross-belt carrier in this Invention (one belt conveyor mounted on one bracket)
Figure 6:
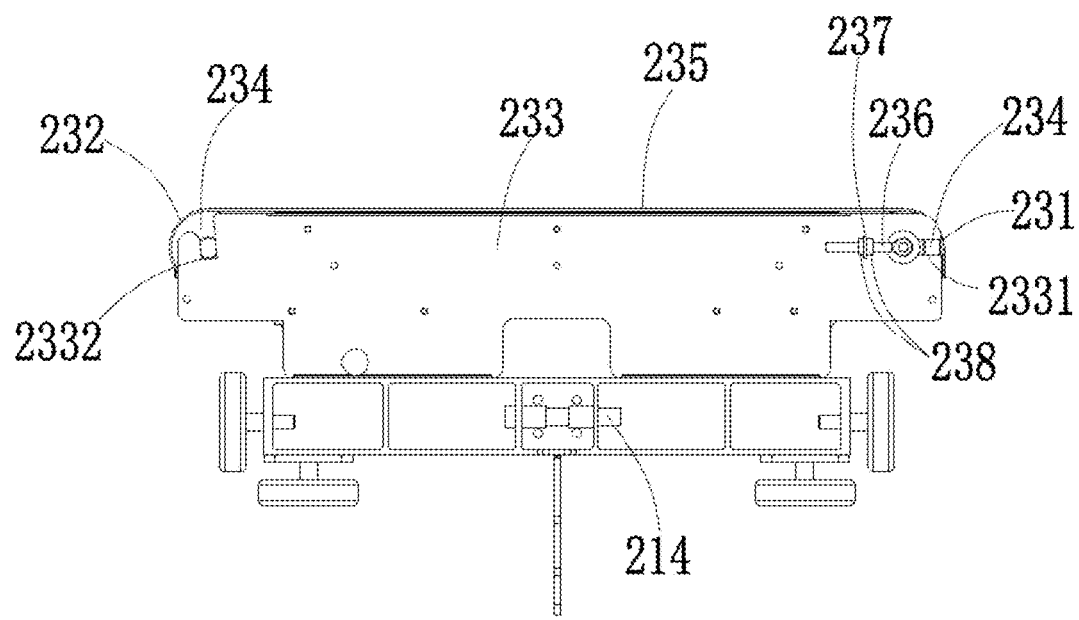

Setting one belt conveyor 23 on the frame 21 is taken as an example below. In case of mounting two belt conveyors 23 on one frame 21, it can be achieved only by increasing the dimension of frame 21. As shown in FIG. 4, the entire frame 21 is I-shaped, containing the short profile 211 and the long profile 213, as well as the connecting profile 212 connecting them, of which, in the middle position of the short profile 211, there is one longitudinal hole 2111. As shown in FIG. 5, there is one connecting hole 2113 at the outer wall 2112 of the longitudinal hole 2111. As shown in FIG. 4 and FIG. 6, one connecting spindle 214 is provided in the middle position of the long profile 213 in the same direction of its extension, and on the profile plate 2131 under the connecting spindle 214, there forms the gap 2132 matching with the position of the connecting spindle 214. As shown in FIG. 4, the connecting profile 212 contains two profiles of equal height at certain spacing which respectively are in screw connection to the middle positions of the short profile 211 and long profile 213.

As shown in FIG. 4-FIG. 6, both ends of the long profile 213 are provided with rollers 22 on the outer side, and the bottom of the long profile 213 is also provided with a guide wheel 24 at a position close to both ends.

The axis of guide wheel 24 is vertical to that of roller 22. When the frame 21 is located on the circular rail, the two rollers 22 are located at one sliding chute 15 respectively. Two guide wheels 24 are respectively fitted with the inner wall of circular rail so as to avoid the swing of frame 21 in the horizontal direction;

As shown in FIG. 3-FIG. 6, the frame 21 is provided with belt conveyor 23 which can be of various feasible and preferred structure. Both ends 231 and 232 of the belt conveyor 23 extend to the outside of both sides of the circular rail 1, to facilitate the connection with other conveyor lines or equipment and avoid the interference of the circular guide rail. In addition, the belt conveyor 23 can perform two-way movement, so that parcels can be transferred between two cross-belt carriers arranged side by side.

Moreover, as shown in FIG. 6, the belt conveyor 23 includes the base frame 233 on frame 21. Both ends of base frame 233 are provided with pulleys 234 respectively. At least one pulley 234 is provided with power roller; the distance between two pulleys 234 is adjustable, and at least one belt 235 is set on them.

The gap between two pulleys 234 is realized by the following structure: as shown in FIG. 6, side plates on both ends of base frame 233 are provided with a pair of mounting grooves 2331 and 2332 used for erecting pulley 234. The extension direction of at least one mounting groove 2331 is the same as the conveying direction of belt 235. Both ends of supporting shaft for the pulley in the mounting groove 2331 are connected with a screw 236 respectively. Such screws 236 pass through the through hole on the supporting plate 237 at the side wall of base frame 233 and are fixed by two nuts 238 on both sides of supporting plate 237. The relative position of screw 236 and supporting plate 237 can be adjusted, so as to adjust the position of corresponding pulley. In this way, the tension of belt 235 can be adjusted to avoid belt breakage due to excessive tightening or belt skidding due to excessive looseness, ensuring the stability of conveying and the reliability of equipment.

In addition, the diameter of the central area of the two pulleys 234 is larger than that of areas on both sides, and the diameter of the two sides shows a trend of decreasing gradually towards the outer end. Therefore, the belt is close to two pulleys 234 when rotating on them with both upper and lower layers in a convex shape, so that belt off-tracking is less likely to occur compared with plane configuration.

Figure 7:
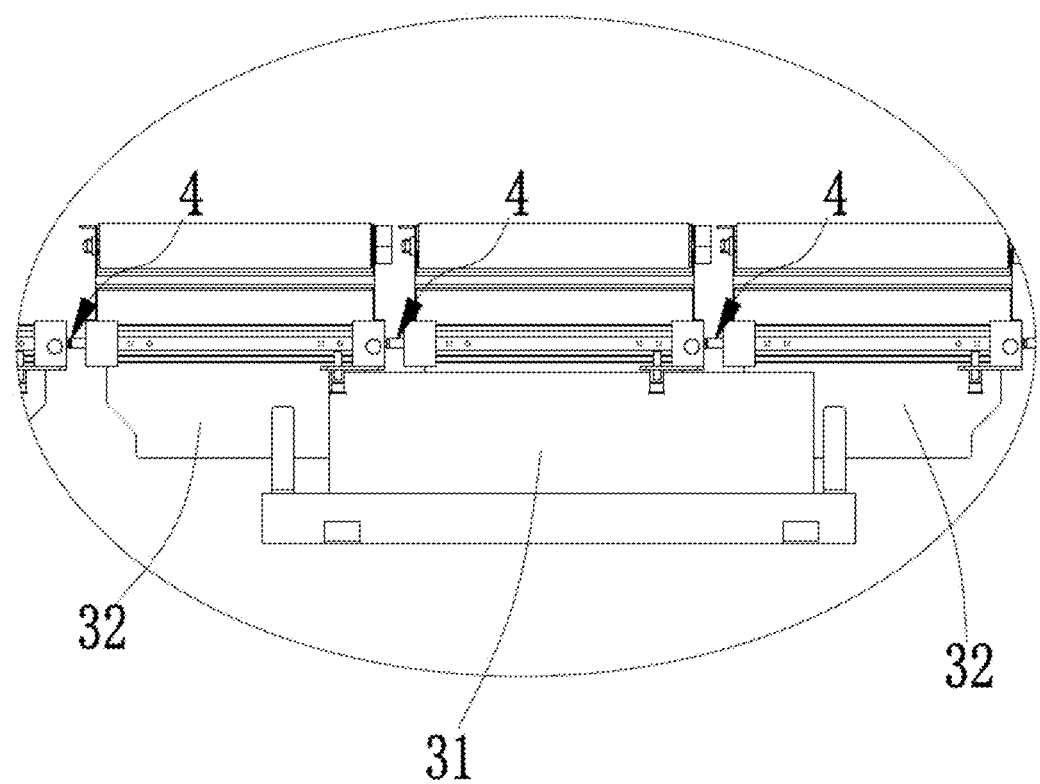
FIG. 7 is the enlarged view of Area B in FIG. 2.

Besides, the double-loop cross-belt sorter also includes power unit 3 used to drive two sets of cross-belt carriers 2 to move along the circular rail 1. The power unit 3 can be a variety of known driving forms such as chain driven form composed of motor+sprocket+chain. As shown in FIG. 2, FIG. 3 and FIG. 7, the power unit 3 preferably includes at least one linear motor 31 and driving plate 32; such driving plate 32 is at least set on the cross-belt carriers 2 partially arranged side by side and driven by electromagnetic thrust generated by linear motor 31. In addition, the number and position of linear motors 31 can be adjusted according to the length of actual conveyor line and target circular speed. The driving plate 32 is inserted into the gap of connecting profiles 212 for each frame 21 and fixed by bolts.

Certainly, the driving plate 32 can also be driven by other devices in friction-driven mode i.e. the rotating friction wheel or belt can contact the driving plate 32 to achieve driving. Multiple-point driving can also be realized by friction driving which is an known technique (and not explained here).

In addition, since there is an arc area in the circular rail, the structure connecting two cross-belt carriers may interfere with the sliding of each cross-belt carrier in the arc area thus causing the carrier to shake. Accordingly, in this scheme, the frames 21 of adjacent cross-belt carriers are pivotally connected. To be specific, as shown in FIG. 7, adjacent frames 21 are connected through rod-end joint bearings 4; the screw ends of the rod-end joint bearings 4 are connected with connecting holes 2113 on the frame with the inner ball at the other end sheathed on the connecting shaft 214. The inner ball is located in the middle of the long profile with both sides respectively limited by limit sleeves set on the connecting shaft 214.

In another feasible embodiment, as shown in FIG. 8, there are two circular rails 1 with difference in height. Besides, the projections of two circular rails 1 coincide on the horizontal plane. At the same time, two sets of parallel cross-belt carriers 2 are set on each circular rail 1 so as to further improve the utilization rate of the longitudinal space. When the same horizontal area is covered, the sorting capacity is doubled.

Figure 9:
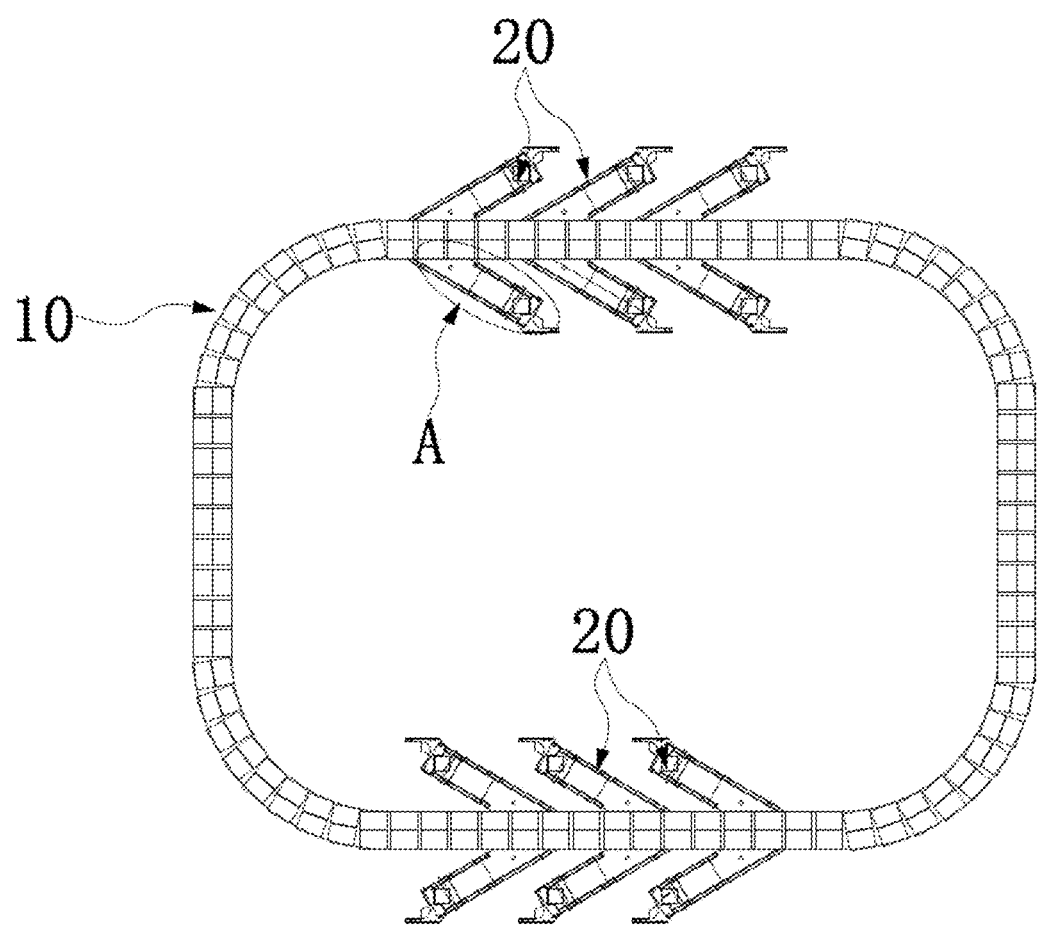
FIG. 9 is the top view of the cross-belt sorter system in this Invention.

This Invention further reveals the cross-belt sorter system as shown in FIG. 9. It includes above various double-loop cross-belt sorters 10. Each conveying loop is connected with at least one infeed line 20; the double-loop cross-belt sorter 10 and infeed line 20 are connected with the control device (not shown in the figure).

As shown in FIG. 9, each conveying loop is connected with three infeed lines 20; infeed lines 20 of outer conveying loop are on the outer side while those of inner conveying loop are on the inner side. At the same time, the width of each infeed line 20 exceeds that of belt conveyor 23 for one cross-belt carrier and is preferably twice the width of two belt conveyors 23. In addition, scanners, dynamic scales and volume measuring device can be set at infeed lines 20.

Figure 10:
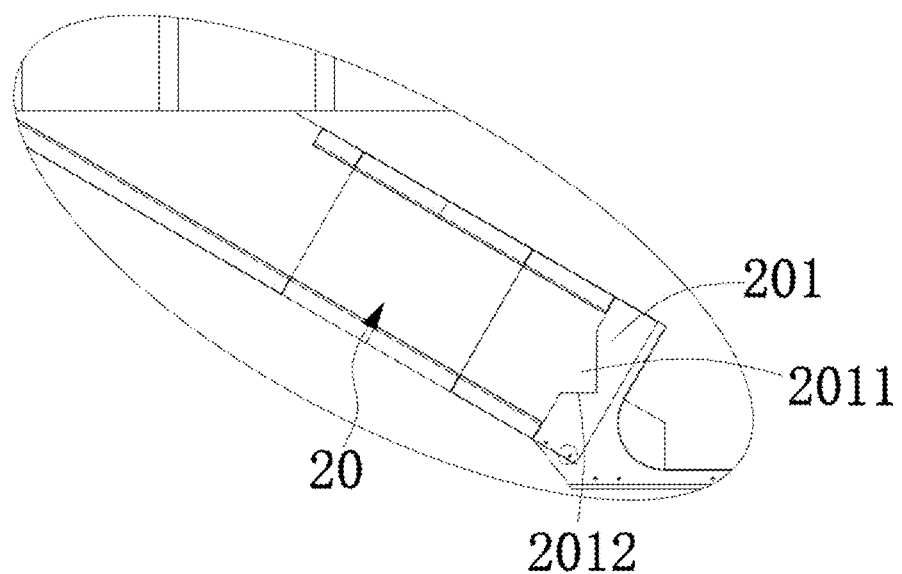
FIG. 10 is the enlarged view of Area A in FIG. 9.

In addition, as shown in FIG. 10, parcel-oriented device 201 is provided at the input end of each infeed line 20. Such parcel-oriented device 201 includes a right-angle locating slot 2011. A plane 2012 of the right-angle locating slot 2011 is parallel to the axial direction of the pulleys of the belt conveyor for cross-belt carrier connected with infeed line 20. At that time, the parcels conveyed on the infeed line 20 can be in a right state on the corresponding cross-belt carriers.

Figure 11:
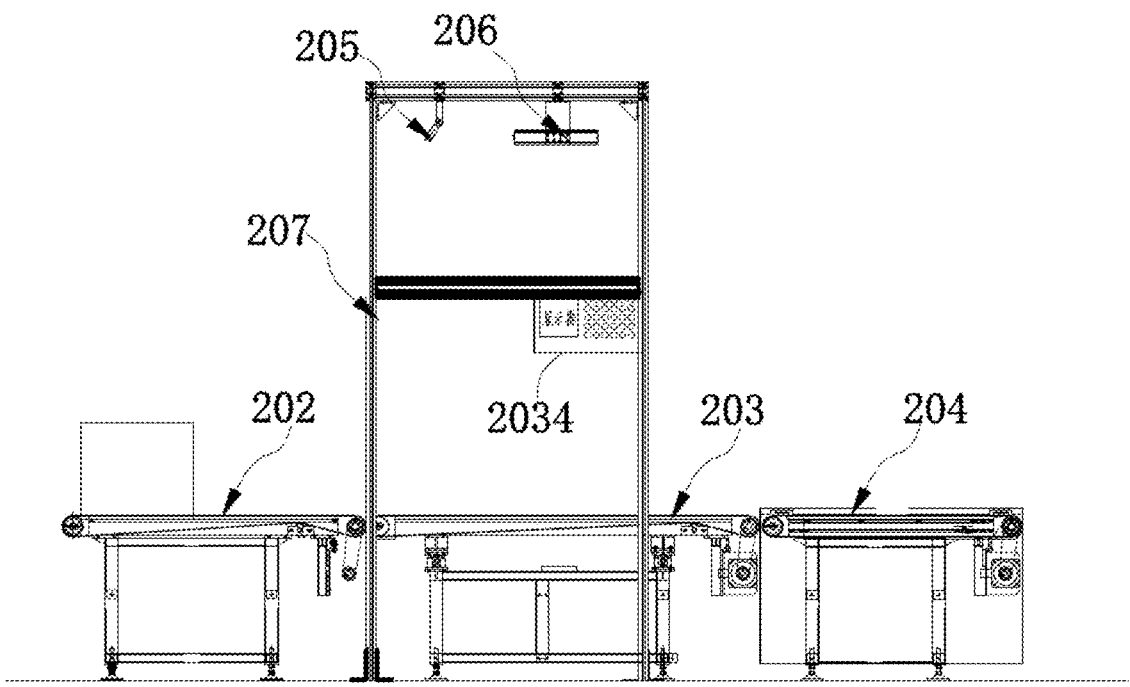
FIG. 11 is the schematic diagram of the infeed line structure in this Invention.

In one feasible embodiment, as shown in FIG. 11, the specific structure of infeed line 20 is as follows: it includes an infeed section 202, dynamic weighing section 203 and accelerated conveying section 204 that are sequentially connected. The infeed section 202 is provided with parcel-oriented device 201. In addition, a barcode or two-dimensional code identification device 205 and a volume measuring device 206 are set through bracket 207 on one or more of infeed section 202, dynamic weighing section 203 and accelerated conveying section 204.

Figure 12:
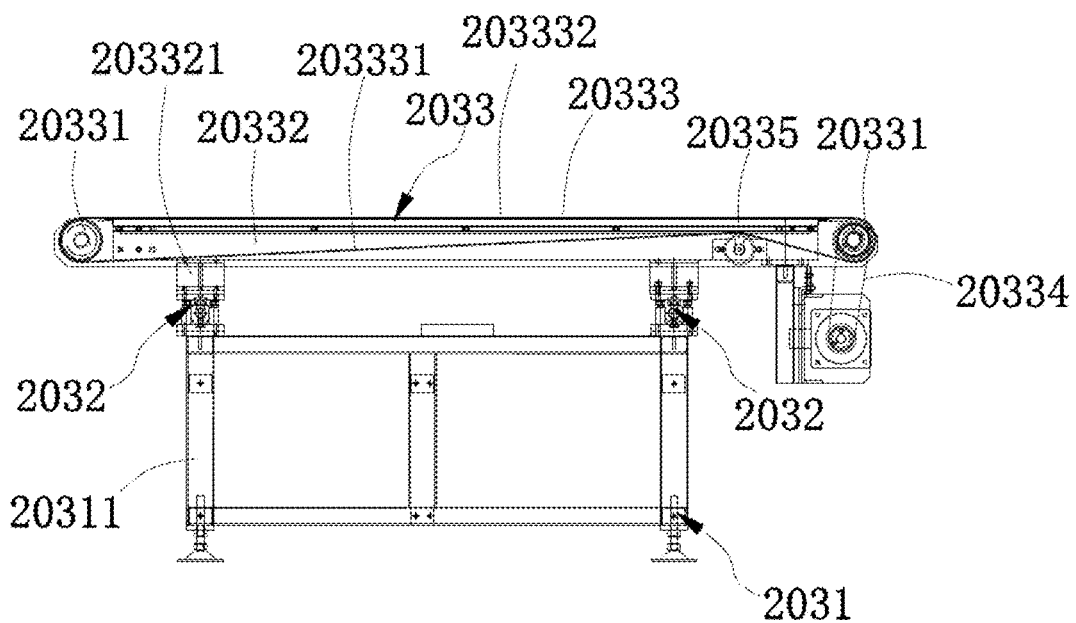
FIG. 12 is the lateral view of the dynamic weighing section in this Invention.

As shown in FIG. 12, the dynamic weighing section 203 includes base frame 2031, conveyor line 2033 connected to the base frame 2031 through load cell 2032, and weighing instrument 2034 that communicates with load cell 2032; the weighing instrument 2034 connects with control devices of the entire system.

The base frame 2031 can be made of various feasible materials or shapes, as long as it can provide stable support. Preferably, as shown in FIG. 12, it includes at least four columns 20311 that are connected as one by the profile. A load cell 2032 is provided on the top surface of each column 20311. The load cell can be various known ones, such as S type, cantilever type, spoke type, plate ring type, bellows type, bridge type and cylinder type, covering various types, models and brands.

Four load cells 2032 are equipped with the conveyor line 2033 which can be either belt conveyor or pulley conveyor. Preferably, take the belt conveyor as an example. As shown in FIG. 12, the conveyor line 2033 includes bracket 20332 which is provided with four legs 203321 mounted on the four load cells 2032. Both ends of the bracket 20332 may respectively rotate a floor-mounted pulley 20331. The balancing precision grade of said pulley 20331 shall not be lower than G16. The two pulleys 20331 are sleeved with belts 20333, and the spindle of at least one pulley 20331 is connected to the power unit 20334 that drives its rotation. The power unit 20334 can be of various feasible structures, such as motor+reducer+wheel+belt or motor+reducer+gear+chain or directly motor+reducer. The conveying speed of the belt 20333 driven by the power unit 20334 shall not be less than 80 m/min.

Figure 13:
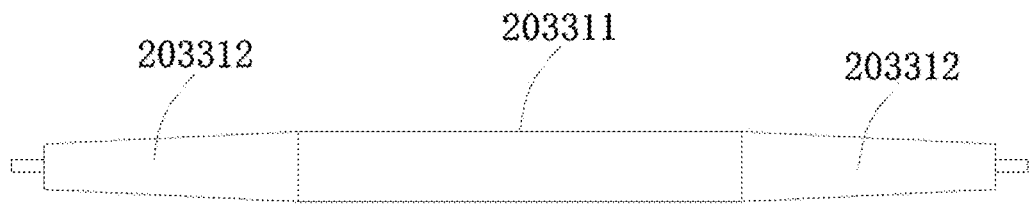
FIG. 13 is the schematic diagram of the pulley at the dynamic weighing section in this Invention.

Furthermore, since the conventional pulley 20331 is made of hot rolled steel, the wall thickness of the formed pulley in different areas is not uniform, resulting in relatively poor balancing precision. Therefore, after the pulley is formed, a milling cutter is used to cut off a layer from the inner wall of the pulley, and, as shown in FIG. 13, make the wall thickness of the middle area 203311 of the pulley greater than that of the area on both sides 203312 of the pulley; in addition, the inventor finds that the thicker the wall of the pulley 20331 is, the greater the weight is, the greater the inertia is, and the more likely dynamic imbalance occurs. Therefore, the wall thickness of the middle area 203311 of the pulley 20331 is controlled to be 6-8 mm, and that of the area on both sides 203312 is controlled to be 4±1 mm.

In addition, if the surface of the pulley 20331 is plane, when the pulley 20331 rotates, the belt 20333 on it is prone to off-tracking, which affects the stability of the equipment operation and the safety of conveying. Therefore, as shown in FIG. 13, the pulley 20331 is designed such that the diameter of the middle area 203311 is larger than that of the area on both sides 203312 and that the area on both sides 203312 forms a circular table shape small at the outer end and large at the inner end. Therefore, when the belt 20333 is in close contact with the pulley 20331, it presents an arc shape, which can increase the difficulty in its translation and avoid belt off-tracking.

Furthermore, in order to increase the degree of adhesion between the belt and the pulley, as shown in FIG. 12, the bracket 20332 can also be rotatably provided with a stretch roll 20335 that has the same extension direction as the pulley 20331 and is located between the two pulleys 20331. The said stretch roll 20335 abuts against the bottom surface of the lower layer of belt 331, and its apex is located above the lowest point of the pulley 20331, so that the distance from the contact point between the lower layer of belt 203331 and the stretch roll 20335 to the upper layer of belt 203332 is smaller than the diameter of the pulley 20331.

Figure 14:
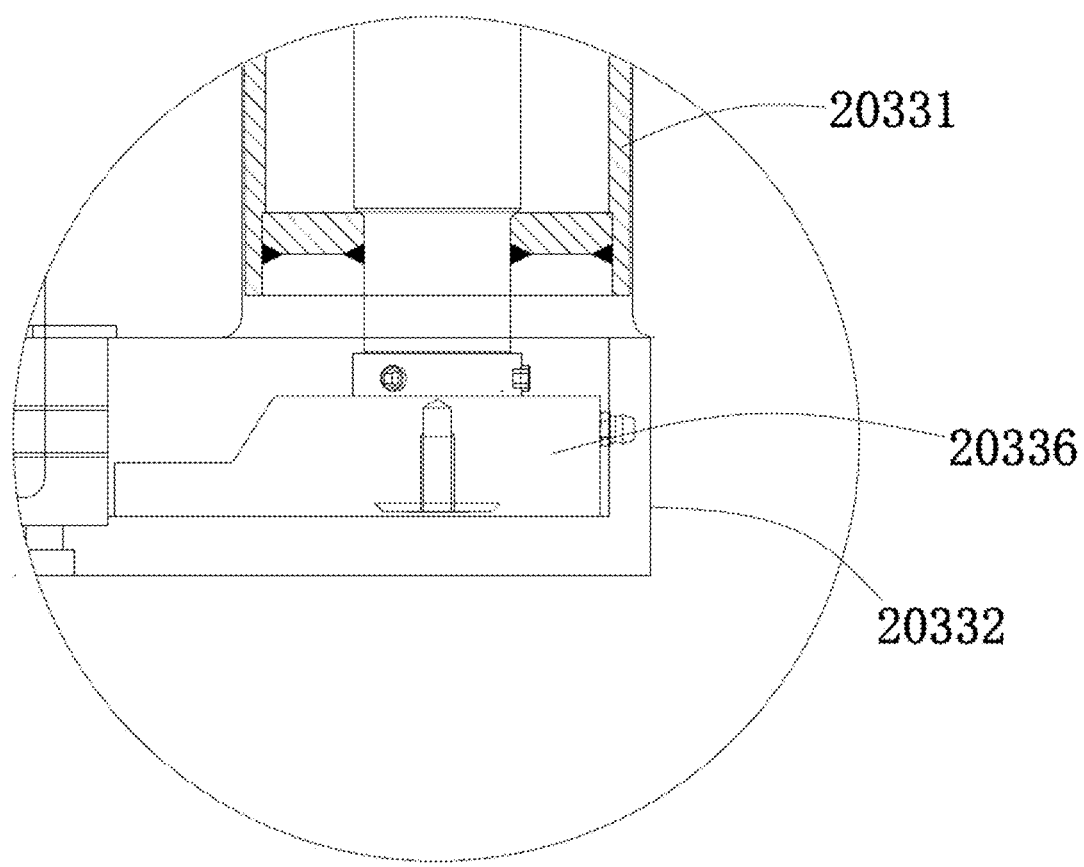
FIG. 14 is the schematic diagram for installation status of the insert bearing with housing and pulley at the dynamic weighing section in this Invention.

At the same time, as shown in FIG. 14, each pulley 20331 is mounted on the bracket 20332 via a pair of insert bearings with housing 20336. During normal installation, the protruding end of the insert bearing with housing 20336 faces outwards (i.e. installed forwards). In this way, the distance between two jackscrews is relatively long, and it is more susceptible to loosening due to the dynamic imbalance of the bearing. Therefore, in this scheme, the insert bearing with housing 20336 is installed on the bracket 20332 backwards, and the protruding ends of the two insert bearings with housing 20336 are arranged inwards and opposite.

At work, the parcel is placed at the parcel-oriented device 201 of the infeed section 202 manually or through an automated equipment room for orientation and then conveying to the dynamic weighing section 203. In the dynamic weighing section 203, the barcode or two-dimensional code identification device 205 reads the barcode or two-dimensional code on the parcel to obtain information such as the route of the parcel. In addition, the load cell and the volume measuring device 206 respectively measure the weight and volume of the parcel, which are bound to the parcel information for storing in the control device. After the corresponding information is obtained, the parcel is conveyed to the accelerated conveying section 204 for acceleration and transferred to a vacant cross-belt carrier 2. When the cross-belt carrier 2 moves to the destination, the belt conveyor of the cross-belt carrier starts to unload the parcel.

When the destination of a parcel on a certain conveying loop is located on another conveying loop, the parcel can be transshipped with two side-by-side belt conveyors.

This Invention has a variety of embodiments, and all the technical schemes developed by using equal or equivalent transformation fall within the protection scope of this Invention.

The invention claimed is:

1. The cross-belt sorter system, comprising: a double-row cross-belt sorter one or more infeed lines, and a control device connected to and configured to control the double row cross-belt sorter and the one or more infeed lines,
wherein the double-row cross-belt sorter comprises:
at least one circular rail;
two sets of cross-belt carriers that are adjacent to each other; and
a power generator, wherein the power generator is configured to drive the two sets of cross-belt carriers to move along the circular rail, and
wherein each infeed line comprises a dynamic weighing section that includes a pulley and a conveyor line, wherein a balancing precision grade of the pulley is not lower than G16.

2. The cross-belt sorter system of claim 1,
wherein an input end of each infeed line is provided with a parcel-oriented device.

3. The cross-belt sorter system of claim 1, wherein a wall thickness in a middle area of the pulley (20331) is larger than a wall thickness of an end section of the pulley.

4. The cross-belt sorter system of claim 1, wherein a diameter in a middle area of the pulley is larger than that a diameter of an end section of the pulley.

5. The cross-belt sorter system of claim 1, wherein the pulley is affixed to a bracket for the conveyor line by an insert bearing with housing that is inversely mounted on the bracket.

6. The cross-belt sorter system of claim 1, wherein the circular rail in the double-row cross-belt sorter is longitudinally arranged or horizontally arranged.

7. The cross-belt sorter system of claim 1, wherein the double-row cross-belt sorter has a first circular rail and a second circular rail, wherein the first circular rail is arranged above the second circular rail, each circular rail having two sets of cross belt carriers arranged thereon.

8. The cross-belt sorter system of claim 1, wherein the two sets of cross-belt carriers in the double-row cross-belt sorter are configured to move synchronously.

9. The cross-belt sorter system of claim 8, wherein, in the double-row cross-belt sorter, the two sets of cross-belt carriers are attached to one common frame configured to move along the circular rail or the two sets of cross-belt carriers are respectively attached two separate frame, and the two separate frames are configured to move along the circular rail.

10. The cross-belt sorter system of claim 9, wherein, in the double-row cross-belt sorter, each of the two sets of cross-belt carriers includes a belt conveyor arranged on the common frame or one of the separate frames, and the belt conveyor is configured to perform two-way conveying.

11. The cross-belt sorter system of claim 9, wherein the two separate frames in the double-row cross-belt sorter are connected by a joint bearing.

12. The cross-belt sorter system of claim 1, wherein, in the double-row cross-belt sorter, the power generator comprises a driving plate arranged at least on a part of cross-belt carriers in each conveying loop and a linear motor or friction-driving device (33) driving the driving plate.

* * * * *